United States Patent Office 3,634,356
Patented Jan. 11, 1972

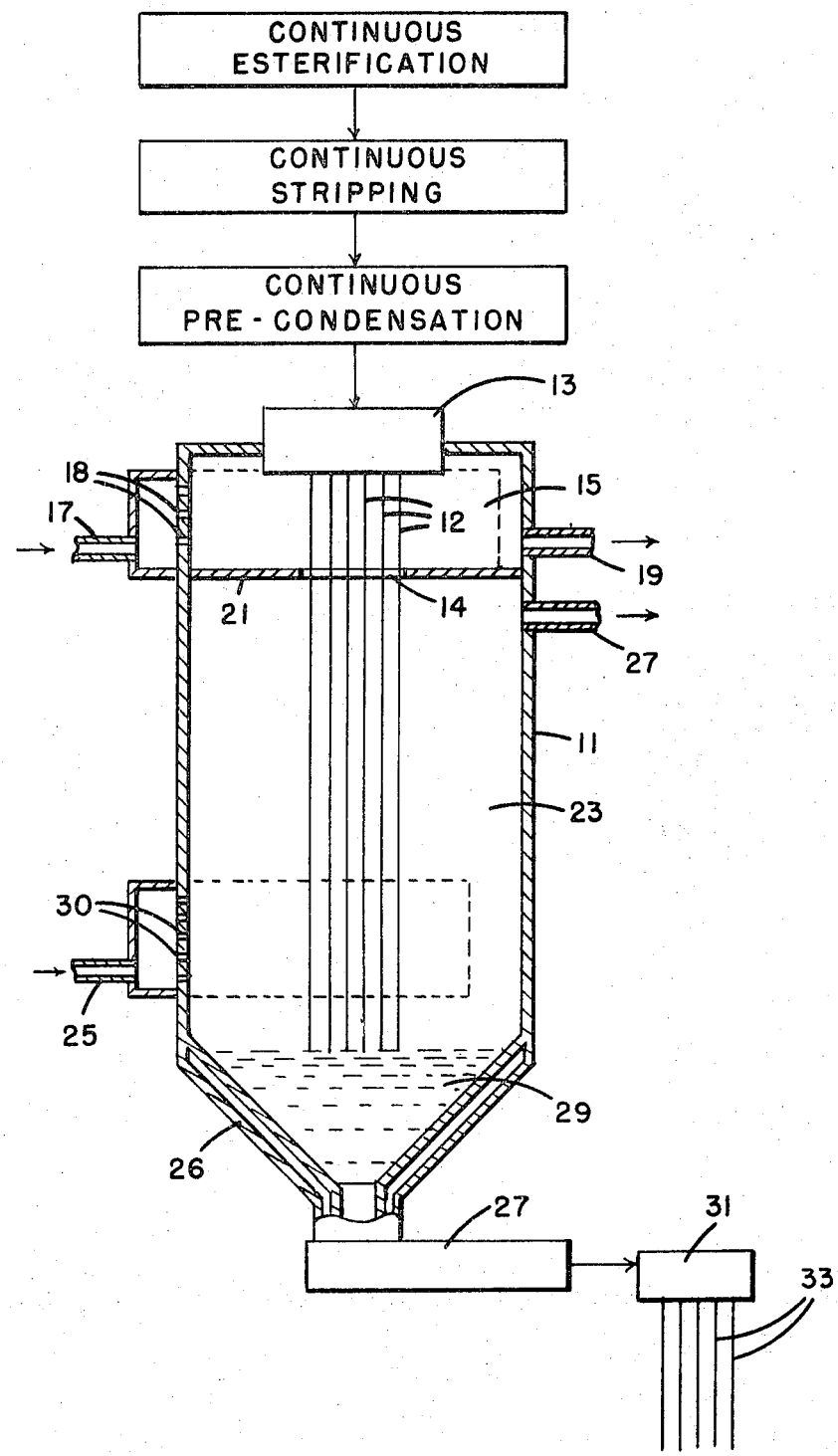

3,634,356
SOLID STATE POLYMERIZATION OF
POLYESTER FILAMENTS
Sager Tryon, Claymont, Del., assignor to FMC
Corporation, Philadelphia, Pa.
Filed May 2, 1969, Ser. No. 821,355
Int. Cl. C08g 17/01
U.S. Cl. 260—75 M
4 Claims

ABSTRACT OF THE DISCLOSURE

A process of increasing the molecular weight of a low molecular weight polyester comprising forming said low molecular weight polyester into solid filaments and then exposing said filaments to a flowing stream of a hot inert gas, maintaining the temperature below the melting point of said filaments, for such a time until the polyester has an intrinsic viscosity of at least 0.60.

---

This invention relates to a process for preparing saturated linear polyester resins. More particularly, it relates to a rapid polycondensation process for the preparation of high molecular weight linear polyester resins.

The high molecular weight linear polyester resins made in accordance with the present invention are known as saturated linear polyesters and can be used for fiber and film-forming purposes. The polyesters made in accordance with the present process can be homopolymers or copolymers. Saturated linear polyester resins can be made by first carrying out an esterification or transesterification reaction between an aromatic dicarboxylic acid component or ester thereof, which do not contain any ethylenic unsaturation, and a suitable lower aliphatic glycol to form a prepolymer. The resulting prepolymer is then polycondensed to form the desired polyester resin. When esters of dicarboxylic acids are used as a starting material, they are first reacted with a glycol component in the presence of a transesterification or ester-interchange catalyst by means of an ester-interchange reaction; whereas when dicarboxylic acids are used as a starting material, they are first subjected to a direct esterification reaction with one or more glycols in the presence of what is generally called a first stage additive or ether inhibitor. In either instance, the resulting product which may be generally described as a polyester prepolymer is then polycondensed in the presence of a polycondensation catalyst to form the desired polyester resin. From a commercial standpoint, it is obvious that it is desirable to form the polyester resin product in the shortest possible time. For filament-forming purposes, a polyester resin should have an intrinsic viscosity preferably not less than about 0.60 (determined in a 60% phenol-40% tetrachloroethane solution, wt./wt., at 30° C.), which corresponds to a degree of polymerization (D.P.) of about 90.

Therefore, it is an object of the present invention to prepare highly polymeric linear polyester resins in the shortest possible time.

Another object of the present invention is to prepare highly polymeric saturated linear polyesters by conventional batch or continuous transesterification or direct esterification reactions coupled with a solid phase polycondensation process.

These and other objects are accomplished in accordance with the present invention, which involves a process of increasing the molecular weight of a low molecular weight polyester comprising forming said low molecular weight polyester into solid filaments of from about 1 to 30 denier and then exposing said filaments to a flowing stream of a hot inert gas, at a temperature below which said filaments become molten for such a time until the polyester has an intrinsic viscosity of a least 0.60. The term "inert gas" is used herein to denote a gas free of oxygen and other gases which can react with the resin being polycondensed.

The polyester resins of the present invention, which can be homopolymers or copolymers can be prepared by either a transesterification or direct esterification process. In either instance, all the reactants can be initially combined and charged into a suitable reactor wherein one of the subject processes is carried out. In the case of the ester-interchange or transesterification method, a mole ratio of one or more suitable diols to one or more suitable diesters of a dicarboxylic acid of from about 1:1 to about 15:1 may be used, but preferably from about 1.5:1 to about 2.6:1. The initial transesterification reaction is generally carried out at atmospheric pressure in an inert atmosphere such as nitrogen, initially at a temperature range of from about 125° C. to about 250° C., but preferably from about 150° C. to 200° C. in the presence of a transesterification catalyst. An alkyl alcohol corresponding to the dialkyl ester of the dicarboxylic acid used is evolved and continuously removed by distillation. After a reaction period of 1 to 2 hours, the temperature of the reaction mixture is raised from about 200° C. to about 290° C. for approximately 1 to 3 hours, while gradually reducing the pressure, in order to complete the reaction, form the desired polyester prepolymer, and distill off any excess diol which is present.

Any of the well-known and suitable transesterification or ester-interchange catalysts, for example, lithium amide, lithium hydride, or zinc acetate can be used to catalyze the transesterification reaction. In most instances, the transesterification catalyst is used in concentrations ranging from 0.01% to about 0.20% based on the weight of the dialkyl ester of the dicarboxylic acid used in the initial reaction mixture.

Alternatively, the preparation of the subject prepolymers or polyester resins can be achieved via the direct esterification method. In the case of the direct esterification method, a mole ratio of diol to dicarboxylic acid of from about 1:1 to about 15:1, but preferably from about 1.5:1 to about 2.6:1, is used. The initial steps of the direct esterification reaction are generally carried out at temperatures ranging from about 180° C. to about 280° C. in the absence of an oxygen-containing atmosphere at atmospheric or elevated pressure for about 2 to 4 hours to form the desired polyester prepolymer. For example, the reaction may be carried out in an atmosphere of nitrogen.

Any of the well-known and suitable direct esterification catalytic additives can be used in the preparation of the present polyester resins via the direct esterification method. However, it is well to avoid acidic catalysts in order to minimize ether formation. For example, triethylamine or calcium acetate may be used. The first stage catalytic additives are generally employed at concentrations ranging from about $5 \times 10^{-5}$ mole to about $5 \times 10^{-2}$ mole of catalytic additive per mole of dicarboxylic acid used in the initial reaction mixture.

A preferred embodiment of the present invention will be more specifically described in the references to the accompanying drawing which is a partially schematic cross-sectional view of apparatus suitable for carrying out the present invention.

A polyester prepolymer is prepared by a continuous transesterification or direct esterification process. This prepolymer is further condensed by a continuous stripping and continuous precondensation process until a low molecular weight polyester having an intrinsic viscosity of at least 0.30 is obtained. This low molecular weight polyester is then extruded into filaments 12 by extrusion and spinning assembly 13 into chamber 15 of the solid phase polymerization apparatus denoted generally as 11. The filaments 12 formed by extrusion and spinning apparatus 13 are about 5 denier. Cooling quenching gas (nitrogen) is introduced into chamber 15 by being pumped through plenum 17 and apertures 18. This cooling gas passes out of chamber 15 through exit opening 19. The extruded filaments 12 are solidified into solid filaments before reaching the bottom of chamber 15. The solid phase polymerization apparatus designated 11 is divided into chambers 15 and 23 by plate 21 having orifice 14 through which filaments 12 can pass. Chamber 23 is provided with entrance plenum 25 provided with openings 30 and exit aperture 27 by means of which heated nitrogen is passed through chamber 23 at a velocity of 3 cm./min. The gas is heated before being passed into chamber 23 to a temperature which is below the melting point of the solidified filaments passing down through said chamber 23. In this instance wherein polyethylene terephthalate is being prepared, the temperature of the flowing stream of hot inert gas in chamber 23 is about 255° C. The bottom of chamber 23 is provided with a heated jacket 26. Jacket 26 can be heated with hot oil, electrically, Dowtherm vapor or other suitable means. The temperature of jacket 26 is adjusted so as to provide sufficient heat in the lower part of the chamber 23 to melt the solidified fibers 12 into a melted resin pool designated 29. The melted resin 29 is then passed through extruder 27 into spinning head 31 from which it is formed into the desired filament product 33.

It is also within the purview of the present process to collect the solid phase polymerized filaments on a spool at the bottom of an apparatus similar to 11 directly without remelting the solidified filaments as specified above in relation to the description of the accompanying drawing. Such a process may be indicated depending on the end use to which the high molecular weight fibers may be employed.

In order to prepare filaments which are suitable for utilization in the solid phase polymerization process of the present invention, it is necessary that the polyester prepolymer product formed by either the transesterification or direct esterification process, set forth above, be further condensed so as to form low molecular weight polyester products. It has been determined that low molecular weight polyesters suitable for solid phase polymerization in accordance with the present process should have an intrinsic viscosity of at least 0.25. In most instances, it has been found that it is preferred to form the subject filaments from a low molecular weight polyester resin which has an intrinsic viscosity between about 0.3 to 0.4. A low molecular weight polyethylene terephthalate resin having such intrinsic viscosity would have a degree of polymerization (D.P.) between about 40 to 54. A polyethylene terephthalate resin having an intrinsic viscosity of about 0.60 would correspond to a degree of polymerization of about 90. The extrusion and spinning of the subject prepolymers is accomplished by utilizing temperatures within the range of from about 200° C. to about 265° C., dependent on the D.P. of the prepolymer.

Filaments of from about 1 denier to about 30 denier can be used in the solid phase polymerization process of the present invention. Using filaments of this thickness, it is readily possible to obtain a very high surface to volume ratio of fibers in a relatively short and uncomplicated solid phase polymerization chamber. However, in view of production rates, quality of product, and apparatus considerations, it is generally preferred to use filaments of the size within the range of from about 1.5 to 20 denier. Obviously, thinner or thicker filaments could also be used, but the use of such filaments is generally not commercially desirable in view of production rates and apparatus considerations.

The temperature of the flowing stream of inert gas is controlled so that the filaments are at a temperature about 5° C. to 10° C. below their melting point. The gas itself can conceivably be above the melting point of the resinous filaments but because of imperfect heat transfer and because of the cooling effect of the vaporization of volatile by-products, the filaments will remain in the desired temperature range. Obviously, the temperature must be varied within these limitations dependent on the D.P. of the prepolymer being used and the melting point of the resinous solid filaments being polycondensed or polymerized. In the case of preparing polyethylene terephthalate in accordance with the present process, the temperature of the flowing hot inert gas to which the solid filaments are exposed should generally be within the range of from about 200° C. to about 260° C.

In the practice of the present invention, it is essential that the stream of hot inert gas used as the solid phase polymerization atmosphere be moving at a velocity of at least 1 cm./min. in order to provide for the efficient removal of condensed glycol produced by the polycondensation of the polyester resin filaments and proper heat exchange with such filaments. There is no upper limit on the velocity of the hot gas used other than that it cannot be so great as to unduly distort or effect the flow of the falling filaments.

The pressure within the solid phase polymerization chamber as used in the present process is basically atmospheric. However, this will obviously vary to a small degree dependent on apparatus used, reactants, velocity of the inert gas, and may under certain conditions, therefore, be slightly greater or less than atmospheric. It may be desirable to operate at reduced pressures in some cases, particularly if a very high molecular weight product is desired.

Because of the high surface to volume ratio obtained with the solid phase polycondensation of fibers in the present process, removal of condensed glycol from the condensing polyester is rapid; and hence, the polycondensation proceeds rapidly when the fibers are exposed to elevated temperatures at low glycol pressures. This is illustrated below in the following example.

EXAMPLE

Undrawn polyethylene terephthalate 220/34 fiber (220 denier per 34 filaments) was heated in a slow stream of nitrogen having a velocity of 1 cm./min. at selected temperatures indicated below for various indicated times and the intrinsic viscosity were determined on the untreated and treated fibers as shown in the following table.

TABLE

| Time, min. | Product intrinsic viscosity | | |
|---|---|---|---|
| | 240° C. | 220° C. | 200° C. |
| 0 | 0.582 | 0.582 | 0.582 |
| 1 | 0.625 | 0.622 | 0.592 |
| 5 | 0.792 | 0.633 | 0.601 |
| 10 | 0.888+ | 0.677 | 0.604 |

From the above results, it is observed that an approximate doubling of the rate of condensation is achieved for each 10° C. rise in temperature by use of the present process.

The present process can be used to prepare any homopolymer or copolymer which is prepared by a polycondensation reaction. For example, in the preparation of polyesters, any suitable diol or combination thereof may be used as one of the initial reactants. For illustration purposes, the diol component can be any of those represented by the general formula $HO(CH_2)_nOH$ wherein $n$ is from 2 to 10 such as ethylene glycol, butylene glycol, or decamethylene glycol. Alternatively, the diol can be a branched chain diol such as neopentyl glycol. Among the dicarboxylic acids or lower alkyl diesters thereof that can be used to prepare polyesters according to the present process are, for example, terephthalic acid, isophthalic acid, 1,6-naphthalene dicarboxylic acid, and 4,4'-diphenyl dicarboxylic acid.

All intrinsic viscosity values given above were based on their determination in a 60% phenol-40% tetrachloroethane solution, wt./wt., at 30° C.

Various changes and modifications can be made without departing from the spirit and scope of the above-described invention, and therefore, this invention is not to be limited except as defined in the appended claims.

I claim:

1. A process of increasing the molecular weight of a low molecular weight polyester comprising forming said low molecular weight polyester into solid filaments of from about 1.0 to 30.0 denier and then exposing said filaments to a flowing stream of a hot inert gas, at a temperature below which said filaments become molten, at essentially atmospheric pressure for such a time until the polyester has an intrinsic viscosity of at least 0.60.

2. The process of claim 1 wherein the temperature of the filaments is maintained about 5 to 10° C. below their melting point.

3. The process of claim 1 wherein the velocity of the flowing inert gas is at least 1 cm./min.

4. The process of claim 1 wherein the said low molecular weight polyester is a partially condensed bis-2-hydroxyethyl terephthalate having an intrinsic viscosity of at least 0.25.

References Cited

UNITED STATES PATENTS

| 3,075,952 | 1/1963 | Coover et al. | 260—75 |
| 3,110,547 | 11/1963 | Emmert | 18—54 |

FOREIGN PATENTS

| 3,815,497 | 8/1963 | Japan. |
| 1,066,162 | 4/1967 | Great Britain. |

OTHER REFERENCES

Kirk-Othmer Encycl. Chem. Technol. 16, 166, 177 (1968).

MELVIN GOLDSTEIN, Primary Examiner